United States Patent
Lee et al.

(10) Patent No.: US 7,965,697 B2
(45) Date of Patent: Jun. 21, 2011

(54) APPARATUS AND METHOD FOR GENERATING SIGNAL ACCORDING TO IFDMA, AND APPARATUS FOR RECEIVING SIGNAL

(75) Inventors: Seung-Joon Lee, Daejeon (KR);
Jong-Ee Oh, Daejeon (KR);
Dong-Seung Kwon, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 349 days.

(21) Appl. No.: 12/064,424

(22) PCT Filed: Aug. 22, 2006

(86) PCT No.: PCT/KR2006/003298
§ 371 (c)(1),
(2), (4) Date: Feb. 21, 2008

(87) PCT Pub. No.: WO2007/024089
PCT Pub. Date: Mar. 1, 2007

(65) Prior Publication Data
US 2008/0225895 A1    Sep. 18, 2008

(30) Foreign Application Priority Data

Aug. 22, 2005  (KR) .................. 10-2005-0076836

(51) Int. Cl.
*H04J 1/00* (2006.01)
(52) U.S. Cl. ....................................... 370/343
(58) Field of Classification Search ........... 370/483, 370/310–350; 375/130–376
See application file for complete search history.

(56) References Cited

U.S. PATENT DOCUMENTS

| | | | | |
|---|---|---|---|---|
| 4,539,760 A | * | 9/1985 | Marchent et al. | 33/356 |
| 6,359,874 B1 | * | 3/2002 | Dent | 370/342 |
| 6,473,394 B1 | * | 10/2002 | Marchok et al. | 370/208 |
| 7,376,074 B2 | * | 5/2008 | Jung et al. | 370/208 |
| 7,545,873 B2 | * | 6/2009 | Yoshii et al. | 375/261 |
| 2005/0083878 A1 | * | 4/2005 | Zehavi | 370/328 |
| 2007/0004465 A1 | * | 1/2007 | Papasakellariou et al. | 455/571 |

FOREIGN PATENT DOCUMENTS

EP    1 385 293    1/2004
(Continued)

OTHER PUBLICATIONS

International Search Report for PCT/KR2006/003298 dated Nov. 17, 2006.

(Continued)

*Primary Examiner* — Derrick W Ferris
*Assistant Examiner* — Mohammad Anwar
(74) *Attorney, Agent, or Firm* — Kile Park Goekjian Reed & McManus PLLC (57) ABSTRACT

A signal generation apparatus and signal receiving apparatus according to an Interleaved Frequency Division Multiple Access scheme is provided. The signal generation apparatus generates a plurality of complex symbols by digital-modulating a plurality of data symbols, and rotates the generated plurality of complex symbols in a plurality of each different phase angles. The signal generation apparatus generates a plurality of transmission symbols by repeating a plurality of rotated complex symbols at predetermined times, and rotating the repeatedly generated plurality of transmission chips in phase angles of an orthogonal phase sequence for the respective users. When the signal receiving apparatus receives the plurality of transmission symbols generated as described above, the maximum diversity gain may be obtained.

8 Claims, 6 Drawing Sheets

FOREIGN PATENT DOCUMENTS

EP  1 445 873  8/2004

OTHER PUBLICATIONS

3GPP TSG RAN WG1 Meeting #44, "Further results of transmit diversity schemes for common, distributed and broadcast channels", Feb. 17, 2006.

TSG-RAN WG1 #43, "Transmit diversity for distributed, common and broadcast channels" Nov. 7-11, 2005.

3GPP TSG RAN WG1 Meeting #42, "Improved Interleaved Frequency Division Multiple Access" Aug. 29-Sep. 2, 2005.

Uli Sorger et al., "Interleaved FDMA—A New Spread-Spectrum Multiple-Access Scheme", IEEE Sep. 1998, pp. 1013-1017.

Michael Schnell et al., "Interleaved FDMA: Equalization and Coded Performance in Mobile Radio Applications", IEEE, 1999, pp. 1939-1944.

Written Opinion for PCT/KR2006/003298 dated Nov. 17, 2006.

* cited by examiner

APPARATUS AND METHOD FOR GENERATING SIGNAL ACCORDING TO IFDMA, AND APPARATUS FOR RECEIVING SIGNAL

BACKGROUND OF THE INVENTION (a) Field of the Invention

The present invention relates to a signal generation apparatus and a signal receiving apparatus according to an Interleaved Frequency Division Multiple Access (IFDMA) scheme. More particularly, the present invention relates to an IFDMA-based signal generation apparatus and signal receiving apparatus for obtaining maximum frequency diversity gain.

(b) Description of the Related Art

An IFDMA transmission scheme having advantages of the spread-spectrum transmission scheme and the multi-carrier transmission scheme is proposed. The signal generation apparatus according to the IFDMA scheme uses a transmission block as shown in FIG. 1.

Figure 1:
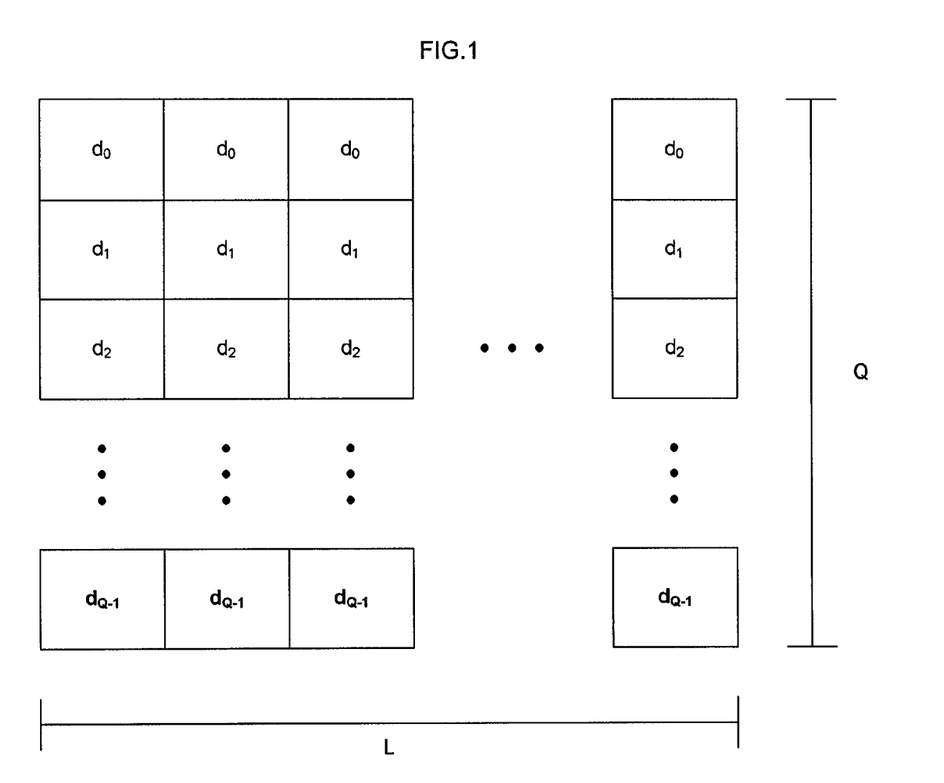
FIG. 1 illustrates a conventional IFDMA transmission block.

FIG. 1 illustrates a conventional IFDMA transmission block.

As shown in FIG. 1, the FDMA transmission block includes Q symbols, which are repeated a total of L times. A minimum unit configuring the transmission block is referred to as a chip. The IFDMA transmission block shown in FIG. 1 includes L*Q chips.

The signal generation apparatus according to the IFDMA scheme generates a transmission signal vector by multiplying orthogonal phase vectors for respective users by the IFDMA transmission block shown in FIG. 1. The signal receiving apparatus according to the IFDMA scheme decodes a symbol of a predetermined user by multiplying the signal generation apparatus-used phase vector by the signal vector received from a channel.

However, according to the conventional IFDMA scheme, the maximum frequency diversity gain may not be obtained.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an IFDMA-based signal generation apparatus and a signal receiving apparatus having advantages of obtaining the maximum frequency diversity gain.

A signal generation apparatus according to an exemplary embodiment of the present invention includes a first rotation unit, a repetition unit, and a second rotation unit. The first rotation unit generates a rotated complex symbol group by rotating a plurality of complex symbols in a plurality of different phase angles each corresponding to a plurality of complex symbols. The repetition unit outputs a plurality of transmission chips by repeating the rotated complex symbol group at predetermined times. The second rotation unit generates a plurality of transmission symbols by rotating the plurality of transmission chips in a plurality of phase angles included in an orthogonal phase sequence for respective users.

The signal generation apparatus may further include a digital modulation unit for generating a plurality of complex symbols by digital-modulating a plurality of data symbols in M phase angles.

In addition, the first rotation unit may generate the rotated complex symbol group by rotating a k-th complex symbol among the plurality of complex symbols in a phase angle that is inverse-proportional to M and proportional to k.

A signal generation method according to an exemplary embodiment of the present invention includes generating a plurality of complex symbols by digital-modulating a plurality of data symbols in M phase angles;

generating a rotated complex symbol group by rotating the plurality of complex symbols in a plurality of different phase angles respectively corresponding to the plurality of complex symbols;

generating a plurality of transmission chips by repeating the rotated complex symbol group at predetermined times; and generating a plurality of transmission symbols by rotating the plurality of transmission chips in phase angles of an orthogonal phase sequence for the respective users.

A signal receiving apparatus according to an exemplary embodiment of the present invention includes a receiving unit, a first inverse-rotation unit, an addition unit, a second inverse-rotation unit, and a digital demodulation unit.

The receiving unit receives a plurality of transmission symbols, the first inverse-rotation unit generates a plurality of chips by inversely rotating a plurality of transmission symbols in phase angles of an orthogonal phase sequence for respective users, the addition unit generates a plurality of complex symbols by adding the chips corresponding to the same data symbols among the plurality of chips, the second inverse-rotation unit generates a plurality of inversely rotated complex symbols by inversely rotating the plurality of complex symbols in a plurality of each different phase angles corresponding to each plurality of complex symbols, and the digital demodulation unit generates data symbols by digital-demodulating the plurality of inversely rotated complex symbols.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is coupled to another element, the element may be directly coupled to the other element or coupled to the other element through a third element.

Now, a signal transmission apparatus 100 according to an exemplary embodiment of the present invention is described in detail with reference to FIG. 2.

Figure 2:
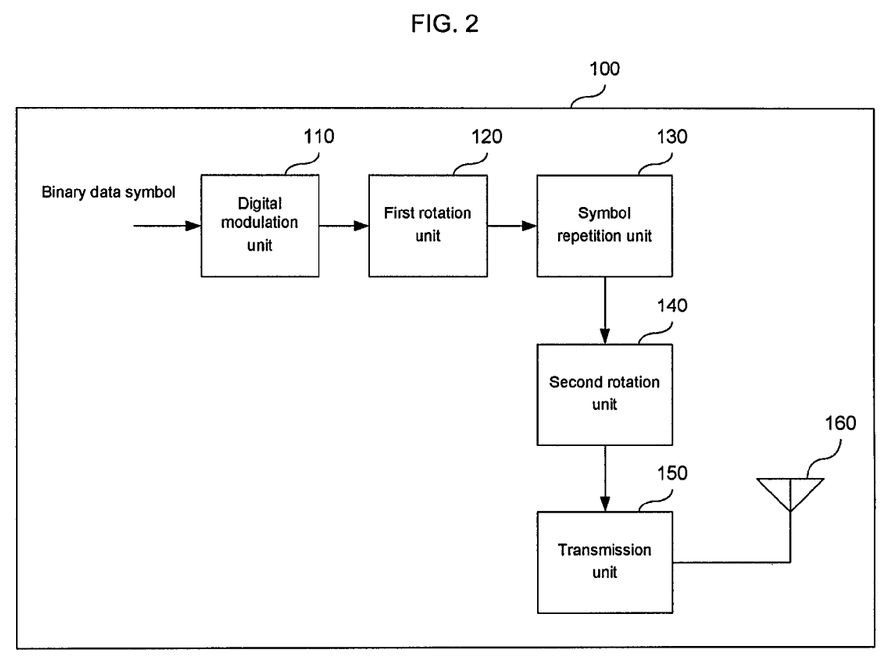
FIG. 2 is a block diagram showing a signal transmission apparatus according to an exemplary embodiment of the present invention.

FIG. 2 is a block diagram showing a signal transmission apparatus according to an exemplary embodiment of the present invention.

As shown in FIG. 2, the signal generation apparatus 100 includes a digital modulation unit 110, a first rotation unit 120, a symbol repetition unit 130, a second rotation unit 140, a transmission unit 150, and an antenna 160. How the constituent elements of the signal generation apparatus 100 are operated is described with reference to FIG. 3.

Figure 3:
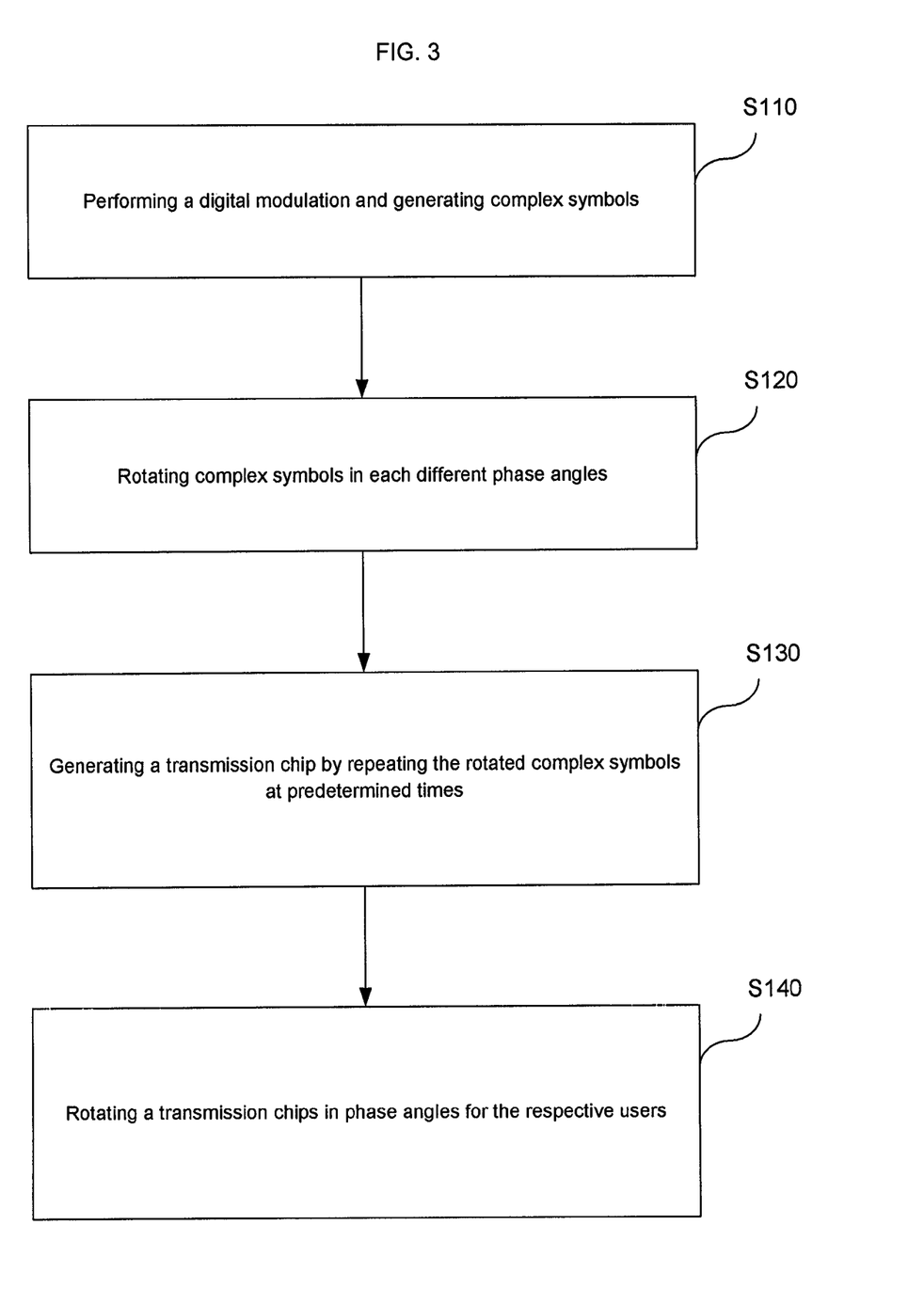
FIG. 3 is a flowchart showing a signal transmission method according to an exemplary embodiment of the present invention.

FIG. 3 is a flowchart showing a signal transmission method according to an exemplary embodiment of the present invention.

First, the digital modulation unit 110 performs digital modulation (M-ary Phase Shift Keying, MPSK) of binary data symbols using M phase angles and generates complex symbols (S110). For example, the digital modulation unit 110 performs BPSK (Binary Phase Shift Keying), 4-PSK, 16-PSK, and 64-PSK.

The first rotation unit 120 handles Q complex symbols generated by the digital modulation unit 110 as one complex symbol group. The complex symbol group ($\{d_k\}$) may be expressed as in Equation 1.

$$\{d_k\} = \{d_0, d_1, \ldots, d_{Q-1}\} \quad \text{(Equation 1)}$$

In Equation 1, a k-th complex symbol of the complex symbol group is given as dk.

The first rotation unit 120 rotates a plurality of complex symbols included in the complex symbol group in each of the different phase angles (S120). The phase angle θk used for the first rotation unit 120 to rotate the complex symbol dk may be expressed as in Equation 2.

$$\{\theta_k\} = \{\theta_1, \theta_2, \ldots, \theta_{Q-1}\} \quad \text{(Equation 2)}$$

A plurality of rotated complex symbols generated by the first rotation unit 120 is referred to as a rotated complex symbol group. The rotated complex symbol group $\{d_k'\}$ may be expressed as in Equation 3.

$$\{d_k'\} = \{d_k e^{j\theta_k}\} \ (k=0,1,2,\ldots,Q-1) \quad \text{(Equation 3)}$$

The first rotation unit 120 may use a rotation angle determined in various manners so as to rotate the complex symbols. The first rotation unit 120 may determine a rotation angle as in Equation 4 so as to obtain the maximum frequency diversity gain.

$$\theta_k = \frac{2\pi}{MQ} k \ (k = 0,1,2, \ldots, Q-1) \quad \text{(Equation 4)}$$

In Equation 4, M is the number of phase angles that the digital modulation unit 110 uses for digital modulation, and Q is the number of complex symbols included in the complex symbol group (hereinafter referred to as a magnitude of the complex symbol group).

Figure 4:
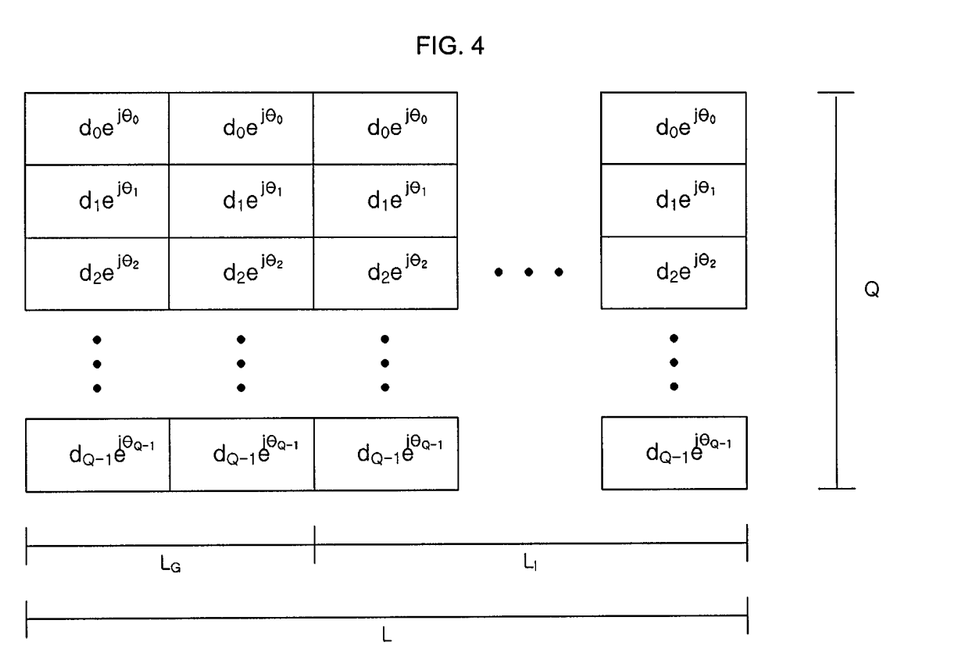
FIG. 4 illustrates an IFDMA transmission block according to an exemplary embodiment of the present invention.

The symbol repetition unit 130 generates a transmission block as in FIG. 4 by repeating the rotated complex symbol group $\{d_k'\}$ at L times (S130).

FIG. 4 illustrates an IFDMA transmission block according to an exemplary embodiment of the present invention.

As shown in FIG. 4, the IFDMA transmission block includes L*Q transmission chips generated by the symbol repetition unit 130. Meanwhile, an LG rotated complex symbol group among the L rotated complex symbol groups included in the IFDMA transmission block may be used as a guard interval. The other LI rotated complex symbol group excluding the LG numbered rotated complex symbol groups among the L rotated complex symbol groups may be used as an information interval.

The L*Q transmission chips included in the IFDMA transmission block may be expressed as in Equation 5.

$$\{c_l\} = \frac{1}{L_I + L_G} \{d'_{l \bmod Q}\} (l = 0,1, \ldots, L \times Q - 1) \quad \text{(Equation 5)}$$

$$= \frac{1}{L_I + L_G} \{d'_0, \ldots, d'_{Q-1}, \ldots, d'_0, \ldots, d'_{Q-1}\}$$

Again, FIG. 3 is referred to.

The second rotation unit 140 generates a plurality of transmission symbols ($\{x_l^{(i)}\}$) by rotating the plurality of transmission chips ($\{c_l\}$) from the symbol repetition unit 130 in phase angles of an orthogonal phase sequence ($\{s_l^{(i)}\}$) for respective users (S140).

The phase sequence ($\{s_l^{(i)}\}$) according to an exemplary embodiment of the present invention may be expressed as in Equation 6.

$$\{s_l^{(i)}\} = \{s_1^{(i)}, s_2^{(i)}, \ldots, s_{LQ-1}^{(i)}\} \quad \text{(Equation 6),}$$

where $s_l^{(i)} = \exp(-j \cdot l \cdot \Phi^{(i)})$ (l=0, 1, \ldots, LQ-1)

The phase angle (user-dependent phase) (Φ(i)) depending on the user (i) may be expressed as in Equation 7.

$$\Phi^{(i)} = i \cdot \frac{2\pi}{QL} \quad \text{(Equation 7)}$$

The second rotation unit 140 generates a plurality of transmission symbols ($\{x_l^{(i)}\}$) as in Equation 8.

$$\{x_l^{(i)}\} = \{c_l \cdot s_l^{(i)}\} \ (l=0, 1, \ldots, LQ-1) \quad \text{(Equation 8)}$$

The transmission unit 150 broadcasts the plurality of transmission symbols ($\{x_l^{(i)}\}$) generated by the second rotation unit 140 through the antenna 160.

A signal receiving apparatus 200 according to an exemplary embodiment of the present invention is described with reference to FIG. 5.

Figure 5:
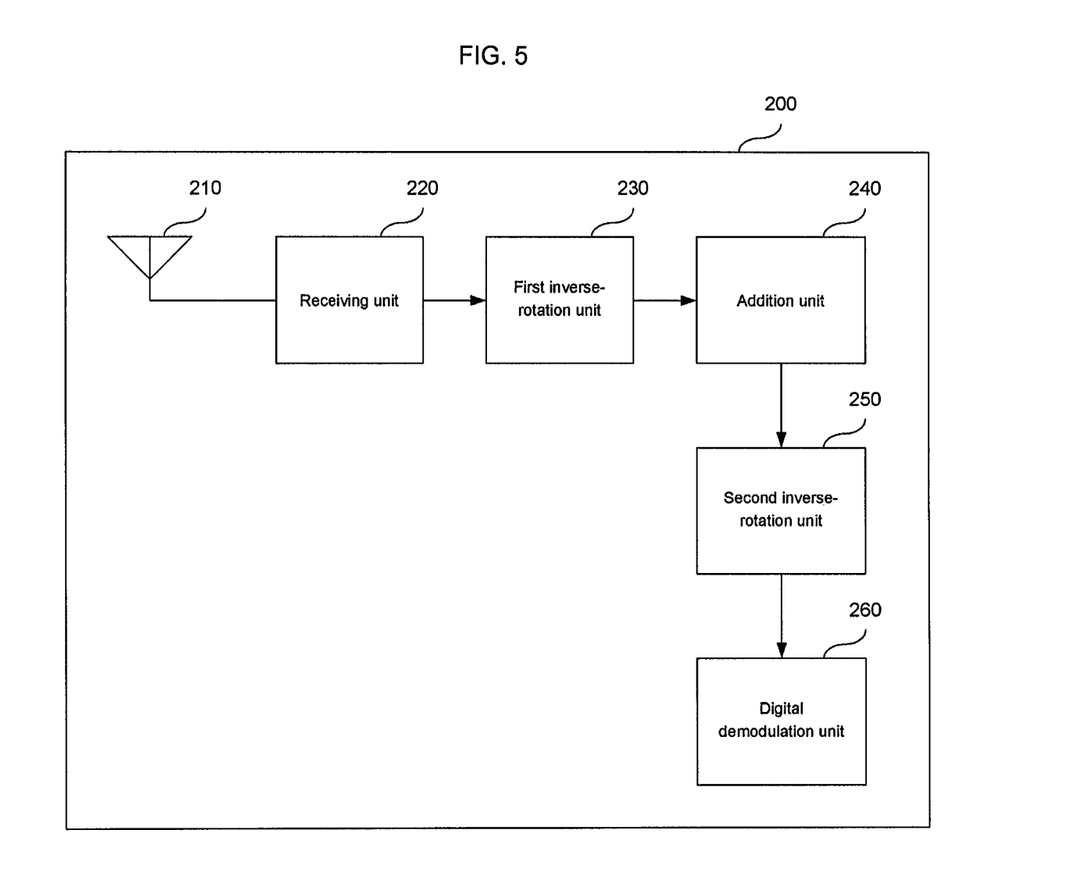
FIG. 5 is a block diagram showing a signal receiving apparatus according to an exemplary embodiment of the present invention.

FIG. 5 is a block diagram showing a signal receiving apparatus according to an exemplary embodiment of the present invention.

As shown in FIG. 5, the signal receiving apparatus 200 includes an antenna 210, a receiving unit 220, a first inverse-rotation unit 230, an addition unit 240, a second inverse-rotation unit 250, and a digital demodulation unit 260.

The receiving unit 220 receives a plurality of symbols ($\{Y_l\}$) through the antenna 210. The plurality of symbols ($\{Y_l\}$) are configured by adding symbols from the signal generation apparatuses 100 of the plurality of users. That is, when a receiving symbol with respect to the transmission symbol ($x_l^{(i)}$) is given as $y_l^{(i)}$, the symbol ($Y_l$) is expressed as in Equation 9.

$$Y_l = \sum_{i=0}^{U} y_l^{(i)} \qquad \text{(Equation 9)}$$

Subsequently, the first inverse-rotation unit 230 generates a plurality of chips ({$c_l$}) by inversely rotating the plurality of symbols ({$Y_l$}) in phase angles of the orthogonal phase sequence ({$s_l^{(i)}$}) for the respective users. The plurality of chips ({$c_l$}) generated by the first inverse-rotation unit 230 is expressed as in Equation 10.

$$c_l = Y_l \cdot \exp(j \cdot l \cdot \Phi^{(i)}) \qquad \text{[Equation 10]}$$

The addition unit 240 generates Q complex symbols ({dk'}, k=0, 1, . . . , Q−1) by adding the chips corresponding to the same data symbols among the plurality of chips ({$c_l$}). The Q complex symbols ({dk'}) generated by the addition unit 240 are symbols corresponding to the predetermined user (i).

The plurality of symbols ({$Y_l$}) are passed through the first inverse-rotation unit 230 and the addition unit 240 so that they are changed as symbols corresponding to the predetermined users because the phase sequences ({$s_l^{(i)}$}) are orthogonal for the respective users.

How the receiving unit 220, the first inverse-rotation unit 230, and addition unit 240 are operated is described with reference to FIG. 6.

Figure 6:
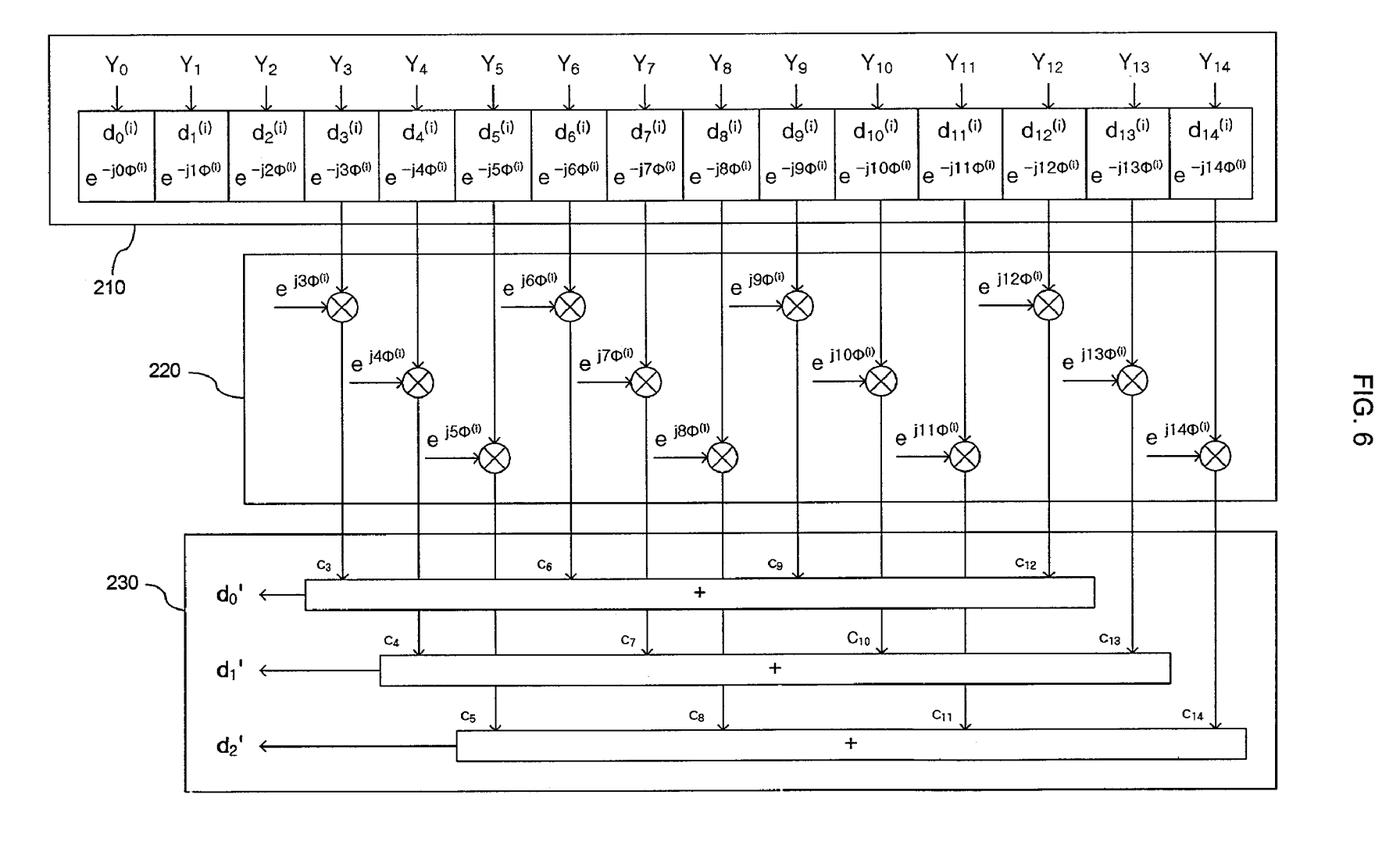
FIG. 6 illustrates an operation of a signal receiving apparatus according to an exemplary embodiment of the present invention.

FIG. 6 illustrates an operation of a signal receiving apparatus according to an exemplary embodiment of the present invention. FIG. 6 illustrates a signal receiving apparatus 200 in the case of LG=1, LI=4, and Q=3.

As shown in FIG. 6, the receiving unit 220 receives 15 receiving symbols (Y0, . . . , Y14). FIG. 6 illustrates that the transmission symbols of the user (i) are stored at a receiving buffer of the receiving unit 220, for convenience. However, the receiving buffer of the receiving unit 220 stores the receiving symbols (Y0, . . . , Y14) that are configured by adding the symbols of the signal generation apparatuses 100 of the plurality of users.

The first inverse-rotation unit 230 generates a plurality of chips (c0, . . . , c14) from a plurality of receiving symbols (Y0, . . . , Y14) by performing the operation of Equation 10. The addition unit 240 performs the operations of Equation 11 to Equation 13 so as to generate complex symbols (d0', d1', d2'). At this time, since the receiving symbols Y0, Y1, and Y2 correspond to the guard interval, the operations are not performed for the receiving symbols Y0, Y1, and Y2.

$$d_0' = c_3 + c_6 + c_9 + c_{12}$$

$$d_1' = c_4 + c_7 + c_{10} + c_{13}$$

$$d_2' = c_5 + c_8 + c_{11} + c_{14} \qquad \text{[Equation 11]}$$

As such, the addition unit 240 generates a plurality of complex symbols by adding the chips corresponding to the same data symbols among the plurality of chips generated by the first inverse-rotation unit 230.

The plurality of complex symbols generated by the addition unit 240 are rotated in predetermined phase angles so as to obtain a diversity gain. Accordingly, the second inverse-rotation unit 250 inversely rotates the plurality of complex symbols generated by the addition unit 240 in the phase angles used in the transmission node. The plurality of complex symbols generated by the inverse-rotation of the second inverse-rotation unit 250 are referred to as inversely-rotated complex symbols. Particularly, when the transmission node uses the same phase angle as in Equation 4, the second inverse-rotation unit 250 performs the inverse-rotation in the same phase angle as in Equation 4.

The plurality of inversely-rotated complex symbols generated by the inverse-rotation of the second inverse-rotation unit 250 are digital-modulated symbols. Accordingly, the digital demodulation unit 260 generates final data symbols by digital-demodulating the plurality of inversely-rotated complex symbols.

The above-described methods and apparatuses are not only realized by the exemplary embodiment of the present invention, but are also intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, the IFDMA based signal generation apparatus generates IFDMA transmission symbols using a plurality of complex symbols rotated in different pluralities of phase angles, thereby obtaining improved diversity gain.

What is claimed is:

1. A signal generation apparatus comprising:
a first rotation unit for generating a rotated complex symbol group by rotating a plurality of complex symbols in a plurality of different phase angles each corresponding to a plurality of complex symbols;
a repetition unit for outputting a plurality of transmission chips by repeating the rotated complex symbol group at predetermined times;
a second rotation unit for generating a plurality of transmission symbols by rotating the plurality of transmission chips in a plurality of phase angles included in an orthogonal phase sequence for respective users; and
a digital modulation unit for generating the plurality of complex symbols by digital-modulating a plurality of data symbols in M phase angles,
wherein the first rotation unit generates the rotated complex symbol group by rotating a k-th complex symbol among the plurality of complex symbols in a phase angle that is inverse-proportional to M and proportional to k.

2. The signal generation apparatus of claim 1, wherein the first rotation unit generates the rotated complex symbol group by rotating a k-th complex symbol among the plurality of complex symbols in a phase angle $$\theta_k = \frac{2\pi}{MQ} k, \text{ and}$$

Q is the number of complex symbols included in the rotated complex symbol group.

3. A signal generation apparatus comprising:
a first rotation unit for generating a rotated complex symbol group by rotating a plurality of complex symbols in a plurality of different phase angles each corresponding to a plurality of complex symbols;
a repetition unit for outputting a plurality of transmission chips by repeating the rotated complex symbol group at predetermined times; and a second rotation unit for generating a plurality of transmission symbols by rotating the plurality of transmission chips in a plurality of phase angles included in an orthogonal phase sequence for respective users, wherein the second rotation unit rotates an l-th transmission chip of the plurality of transmission chips in a phase angle that is proportional to the l and a user number.

4. The signal generation apparatus of claim 3, wherein the second rotation unit rotates an l-th transmission chip of the plurality of transmission chips in a phase angle $$l \cdot i \cdot \frac{2\pi}{QL},$$

and herein, i is the user number, Q is the number of the complex symbols included in the rotated complex symbol group, and L is the number of the repetition unit repeating the rotated complex symbol group.

5. A signal generation method for use in a signal generation system comprising a rotation unit, a repetition unit, and a digital modulation unit, the signal generation method comprising:

generating a plurality of complex symbols by digital-modulating a plurality of data symbols in M phase angles in the digital modulation unit;

generating a rotated complex symbol group by rotating the plurality of complex symbols provided from the digital modulation unit in a plurality of different phase angles respectively corresponding to the plurality of complex symbols in the rotation unit;

generating a plurality of transmission chips by repeating the rotated complex symbol group provided from the rotation unit at predetermined times in the repetition unit; and generating a plurality of transmission symbols by rotating the plurality of transmission chips provided form the repetition unit in phase angles of an orthogonal phase sequence for the respective users in the rotation unit, wherein the generating of the rotated complex symbol group includes generating the rotated complex symbol group by rotating a k-th complex symbol among the plurality of complex symbols in a phase angle that is inverse-proportional to M and proportional to k.

6. The signal generation method of claim 5, wherein the generating of the plurality of transmission symbol includes generating the plurality of transmission symbols by rotating an l-th transmission chip of the plurality of transmission chips in a phase angle proportional to the l and a user number.

7. A signal receiving apparatus comprising:

a receiving unit receiving a plurality of transmission symbols;

a first inverse-rotation unit for generating a plurality of chips by inversely rotating a plurality of transmission symbols in phase angles of an orthogonal phase sequence for respective users;

an addition unit for generating a plurality of complex symbols by adding the chips corresponding to the same data symbols among the plurality of chips;

a second inverse-rotation unit for generating a plurality of inversely rotated complex symbols by inversely rotating the plurality of complex symbols in a plurality of different phase angles corresponding to each plurality of complex symbols; and a digital demodulation unit for generating data symbols by digital-demodulating the plurality of inversely rotated complex symbols, wherein the digital demodulation unit performs the digital demodulation using M phase angles, and the second inverse-rotation unit generates the plurality of inversely complex symbols by rotating a k-th complex symbol among the plurality of complex symbols in a phase angle that is inverse-proportional to M and proportional to k.

8. The signal receiving apparatus of claim 7, wherein the first inverse-rotation unit inversely rotates an l-th transmission symbol of the plurality of transmission symbols in a phase angle proportional to the l and a user number.

* * * * *